United States Patent

Ruf et al.

[11] 4,009,701
[45] Mar. 1, 1977

[54] INTERNAL COMBUSTION ENGINE HAVING PROVISIONS FOR HEATING THE FUEL-AIR MIXTURE BY MEANS OF THE EXHAUST

[75] Inventors: Max Ruf, Obereisesheim; Johannes Steinwart, Obersulm-Willsbach, both of Germany

[73] Assignee: Audi NSU Auto Union Aktiengesellschaft, Germany

[22] Filed: May 20, 1976

[21] Appl. No.: 688,344

[30] Foreign Application Priority Data

May 22, 1975 Germany .................... 2522671

[52] U.S. Cl. ............. 123/122 AC; 123/122 AB; 123/122 H; 261/144; 261/145; 165/51; 165/52; 60/901
[51] Int. Cl.² .................................. F02M 31/00
[58] Field of Search ... 123/122 H, 122 AB, 122 AC; 261/144, 145; 165/51, 52; 60/901, 282

[56] References Cited
UNITED STATES PATENTS

| 1,318,068 | 10/1919 | Giesler | 123/122 H |
| 3,809,019 | 5/1974 | Stoltman | 60/901 |
| 3,832,984 | 9/1974 | Taguchi | 123/122 AB |
| 3,968,648 | 7/1976 | Futamura | 123/122 AC |

Primary Examiner—Ronald H. Lazarus
Attorney, Agent, or Firm—Kane, Dalsimer, Kane, Sullivan and Kurucz

[57] ABSTRACT

A device heats the fuel-air mixture by means of the exhaust in an internal combustion engine having an intake for the fuel-air mixture and an exhaust gas line, with a portion of the intake and a portion of the exhaust line having a common wall for heat transfer.

6 Claims, 3 Drawing Figures

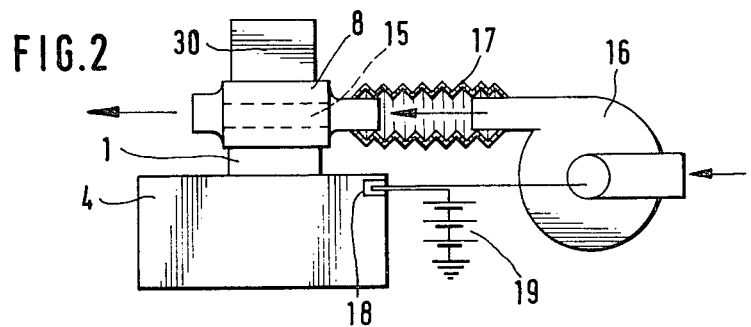
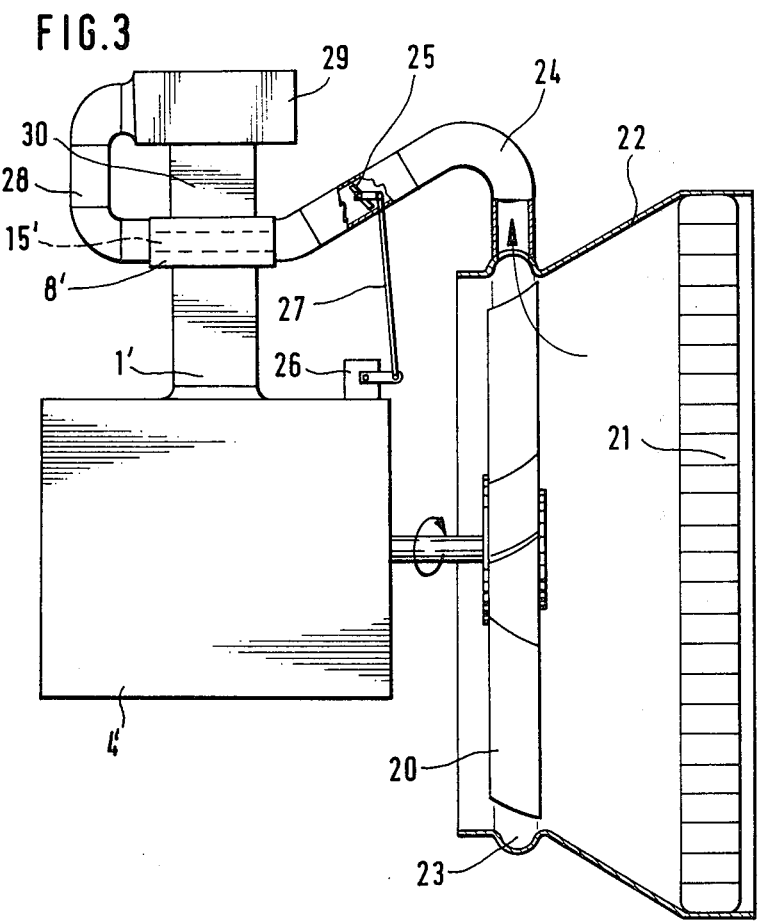

INTERNAL COMBUSTION ENGINE HAVING PROVISIONS FOR HEATING THE FUEL-AIR MIXTURE BY MEANS OF THE EXHAUST

BACKGROUND OF THE INVENTION

There are a variety of devices the purpose of which is to evaporate the fuel components entering the intake in the liquid state by preheating the fuel-air mixture. In this manner, a better preparation of the fuel-air mixture is achieved, whereby the presence of constituents injurious to health in the exhaust may be diminished. Preheating of this type is advantageous especially at low load, since it prevents the carbureted fuel from recondensing in this operating mode, with resulting combustion of a leaner fuel-air mixture, thereby reducing the efficiency of the engine. At full load when the engine is hot, on the other hand, preheating is not desirable since losses of fill would result. To obtain controllable preheating, more or less effective depending on the operating condition of the engine, dampers have been proposed, arranged in the intake and/or exhaust line in order to deflect or divert the incoming fuel-air mixture and/or the exhaust flow from the heat transfer wall. Such dampers, however, have the disadvantage of interfering seriously with the direction of flow of the incoming fuel-air mixture by a deflection or partial constriction and displacement of the port area, and may lead to separation of the mixture, while in the exhaust line a resistance is created that undesirably increases the back pressure.

SUMMARY OF THE INVENTION

The object of the invention is to provide a device that will avoid any overheating beyond a certain level when the intake heats up rapidly, but not have any adverse effect on the direction of flow of the fuel-air mixture and/or exhaust.

In accordance with the present invention, this object is accomplished by providing the heat transfer wall with a plurality of through coolant passages capable of being connected to a source of coolant when a certain operating temperature is reached.

In this proposed arrangement the transfer of exhaust heat from the exhaust line to the intake to heat the fuel-air mixture takes place, predominantly by way of the webs formed in the heat-transferring wall by the coolant passages. In the event of an operating temperature of the engine beyond a certain limit, the coolant passages can cool the heat-transferring wall and prevent any undesirably intense transfer of exhaust heat to the intake. The coolant delivered from the coolant source to the coolant passages may be cooling air or alternatively a liquid coolant.

The coolant source may consist of a special fan controlled by the temperature of the engine. Such a fan can suitably cool the heat-transferring wall so that a greater or lesser fraction of the heat to be transferred from the exhaust to the intake is diverted depending on the operating temperature of the engine. Consequently, proper heating of the intake will result. For example, the actuation of the fan may be controlled by a sensor responding to the operating temperature of the engine.

In the case of a liquid-cooled engine having a liquid cooler and a cooling fan arranged in the vicinity of the cooler, the coolant source may consist of the cooling fan and a damper controllable according to the temperature of the engine which may be arranged in the line from the cooling fan to the coolant passages in the heat-transferring wall. In this version, use may be made of the cooling air being constantly delivered by the cooling fan in any case. The flow of cooling air entering the passages in the heat-transferring wall may be controlled in this version by the damper arranged in the line. In this case also, the heat acting in the heat-transferring wall on the intake may be adjusted in the desired manner. The damper varying the port area of the line may in this arrangement be acted upon, for example, by an expansion element or by a member expanding as a function of temperature.

The coolant passages in the heat-transferring wall may be connected by a line connected in turn to the intake of the engine. In this way, the air emerging from the coolant passages and heated therein may then be supplied to the engine, with advantageous effect upon mixture formation especially at low ambient temperatures.

In an internal combustion engine whose exhaust empties into a jacketed reactor chamber, the heat-transferring wall may be a part of the jacket of the reactor chamber. An opening may be provided in the wall of the reactor chamber at the point facing the heat-transferring wall. This solution has the advantage of compact construction of the intake together with the exhaust system. This has the advantage of a short path for the exhaust to the reactor chamber and simultaneously the use of means to heat the fuel-air mixture. The opening in the wall of the reactor chamber allows the hot exhaust to impinge directly on the heat-transferring wall to thus heat it.

In order to avoid any interference with the process of reaction of the exhaust in the reactor chamber by the withdrawal of heat from the reactor chamber for heat transfer, provision is made to arrange baffles in the reactor chamber. The baffles serve to guide the exhaust flow to the part of the wall of the reactor chamber facing the heat-transferring wall only after it has traversed a substantial portion of the reactor chamber. As a result, contact of the exhaust with the heat-transferring wall will occur only after the exhaust has travelled a considerable distance inside the reactor chamber and the reaction of the exhaust has been completed to a large extent.

In the proposed engine, a large quantity of heat can be given off to the intake at low load. When the engine is hot and at full load, the cooling of the heat-transferring wall serves to diminish the heating effect, whereby the proper heating for the composition of the mixture in each operating condition is established. In this manner, there will be a reduction in the emission of pollutants in the exhaust while avoiding loss of power. Furthermore, this expedient has the advantage that both the fuel-air mixture and the exhaust retain their direction of flow without change.

Other details and features of this invention of a fuel-air mixture heating device will appear from the description to follow in conjunction with the drawings, representing exemplary embodiments of the invention.

BRIEF DESCRIPTION OF THE DRAWINGS

In the drawings:

FIG. 2 shows a schematic representation of a heat-transferring wall with fan arranged between the intake duct and the exhaust line; and FIG. 3 shows a schematic representation of a heat-transferring wall with cooling fan in another embodiment.

DETAILED DESCRIPTION

Figure 1:
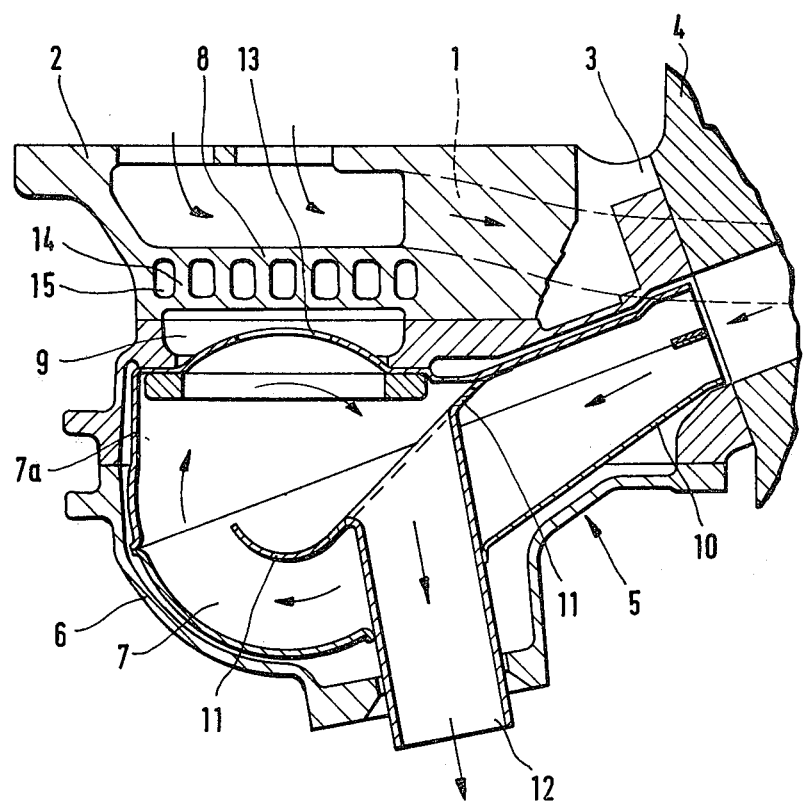
FIG. 1 shows a cross-section of the intake duct and an exhaust line in the form of a reactor adjacent thereto.

Reference is made first to FIG. 1, in which an intake 1 for supplying fuel-air mixture communicates on the one hand by means of a flange 2 with a carburetor (not shown) and on the other hand, by means of flange 3 with an internal combustion engine 4 only fragmentarily shown. An exhaust line is provided for expelling burned gases from the engine 4. The exhaust line in this embodiment takes the form of a reactor 5 consisting of a chamber 7 surrounded by a jacket 6. For purposes of preheating and better preparation of the fuel-air mixture, a portion of the intake 1 and a portion of the reactor 5 have a common heat-transfer wall 8 capable of being heated by the exhaust. The heat-transferring wall 8 is a component of the intake 1, while the jacket 6 of reactor 5 is flanged directly to the heat-transferring wall 8 and has an opening 9 in the region of the wall 8 so that the heat-transferring wall 8 becomes a part of the jacket 6 of the reactor 5 at this point.

In operation of the engine, the exhaust leaves the engine 4 by way of a pipe 10 opening tangentially into the reactor chamber 7. The exhaust enters the chamber 7 and at first is guided in known manner along the wall of the chamber 7 by baffles 11 for facilitating afterburning of noxious exhaust constituents and at the same time is set in swirling motion. Only when this reaction of the exhaust is far advanced so that no essential interference with the afterburning process is possible, the hot exhaust before passing off through an outlet pipe 12, impinges on the heat-transferring wall 8 and heats it. For this purpose, that is, for direct bathing of the heat-transferring wall 8 by the exhaust an opening 13 is provided in the reactor chamber 7 facing the heating-transferring wall 8. As a result of the heating of the heat-transferring wall 8, the fuel-air mixture passing through the intake 1 into the engine 4 is heated and thus better prepared. The heat-transfer within the wall 8 takes place through webs 14 left by a plurality of through coolant passages 15.

In order to avoid the possibility of any unduly intense heat transfer at full load when the engine is hot, with possible resulting losses of fill the coolant passages 15 may be connected to a source of coolant when a certain operating temperature is reached and, accordingly, cool the heat-transferring wall 8.

As shown in the schematic arrangement of FIG. 2, the heat-transferring wall 8 located after carburetor 30 is cooled by a coolant source in the form of a blower 16 communicating with the coolant passages 15 by way of a line 17. The blower 16 is connected to a source of current 19 by a thermocouple 18 installed in the engine 4, and can thus be controlled by the temperature of the engine 4 to deliver cooling air through the passages 15 in the heat-transferring wall 8. Accordingly, when the engine 4 is cooled and at low load when a greater quantity of heat is to be transferred to the intake 1, no cooling air is delivered by the blower 16. Only when the engine 4 reaches a certain operating temperature whereupon the danger of loss of fill may arise, is the blower 16 switched on to cool the heat-transferring wall 8. Thus, the blower 16 may be controlled by the thermocouple 18 so that with further increase in temperature of the engine 4 the delivery of the blower 16 and hence the cooling effect increases. In this manner, a largely uniform transfer of heat at the wall 8 and the proper heating for the composition of the mixture can be maintained.

FIG. 3 shows another embodiment of a fuel-air mixture heating device which dispenses with the special blower. The heat-transferring wall 8' is supplied with cooling air in this modification by a coolant source in the form of a cooling fan 20 such as is conventionally arranged in the vicinity of the radiator 21 of a liquid-cooled engine 4. The air collector 22 ordinarily provided to guide the cooling air for this purpose has an annular space 23 radial to the fan 20 and communicates by means of a line 24 with the coolant passages 15' in the heat-transferring wall 8'. In the line 24 a flap 25 is arranged capable of being controlled and actuated by linkage 27 by a bimetallic element 26 mounted on the engine 4'. Inasmuch as the fan 20 delivers cooling air at all times when the engine is operating, the flap 25 remains closed when the engine is cold or at low load when transfer of a considerable quantity of heat from the exhaust system to the intake 1' is desirable. At this time, no cooling of the heat-transferring wall 8' takes place. After a certain operating temperature has been reached the flap 25 opens gradually under the influence of the heating of the engine 4', so that a certain flow of cooling air is delivered to the coolant passages 15' of the heat-transferring wall 8'. At full load and high engine temperature, the flap 25 at last opens completely, cooling the heat-transferring wall 8' to such an extent that no losses of fill can occur in the supply of fuel-air mixture to intake 1'. Through this continuous control of the supply of cooling air, the intake can thus always be heated and/or cooled in accordance with requirements.

As shown in FIG. 3, a line 28 may connect with the coolant passages 15' of the heat-transferring wall 8', and communicate with the intake 1 by way of an air filter 29 and a carburetor 30. In this way, particularly at low outside temperatures, the air heated in the coolant passages 15 may be supplied to the engine 4 for further improvement of mixture formation. The line 28 may be so fashioned that it may be taken down as desired.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is

1. An internal combustion engine having an intake for the fuel-air mixture and an exhaust line, a device for pre-heating the fuel-air mixture by means of the engine exhaust comprising a portion of the intake and a portion of the exhaust line having a common wall for heat transfer, the heat-transfer wall having a plurality of through coolant passages and means for connecting the passages to a source of coolant when a certain operating temperature is reached.

2. A device according to claim 1, wherein the coolant source is in the form of a blower capable of being controlled by the temperature of the engine.

3. A device according to claim 1, wherein the engine is a liquid cooled engine having a radiator and a cooling fan arranged in the vicinity of the radiator, the cooling fan being the source of coolant, a flap controlled by the temperature of the engine being arranged in the line extending from the fan to the coolant passages in the heat-transferring wall.

4. A device according to claim 3, wherein the coolant passages in the heat-transferring wall connect with the line which is connected in turn to the intake of the engine.

5. A device according to claim 1, wherein a reactor chamber surrounded by a jacket receives the exhaust of the engines, the heat-transferring wall forms part of the jacket of the chamber and an opening is provided in the wall of the chamber at the point facing the heat-transferring wall.

6. A device according to claim 5, wherein baffles are arranged in the reactor chamber that guide the exhaust flow to the point facing the heat-transferring wall in the wall of the reactor chamber only after transversal of a substantial portion of the chamber.

* * * * *